(12) United States Patent
Trump

(10) Patent No.: US 8,260,613 B2
(45) Date of Patent: Sep. 4, 2012

(54) DOUBLE TALK DETECTOR

(75) Inventor: Tonu Trump, Tallin (EE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 607 days.

(21) Appl. No.: 12/528,202

(22) PCT Filed: Feb. 21, 2007

(86) PCT No.: PCT/SE2007/050100
§ 371 (c)(1),
(2), (4) Date: Aug. 21, 2009

(87) PCT Pub. No.: WO2008/103087
PCT Pub. Date: Aug. 28, 2008

(65) Prior Publication Data
US 2010/0063809 A1    Mar. 11, 2010

(51) Int. Cl.
*G10L 21/02*    (2006.01)
(52) U.S. Cl. ........ 704/228; 704/201; 704/203; 704/208; 704/210; 704/215; 704/219; 704/223; 704/225; 348/349; 379/406.13; 84/600; 84/603; 84/604
(58) Field of Classification Search ............... 348/349; 379/406.13; 704/201, 203, 208, 210, 215, 704/219, 223, 225; 84/600, 603, 604
See application file for complete search history.

(56) References Cited

U.S. PATENT DOCUMENTS

| 5,664,055 | A * | 9/1997 | Kroon ............................ 704/223 |
| 6,078,880 | A * | 6/2000 | Zinser et al. ................... 704/208 |
| 6,167,133 | A * | 12/2000 | Caceres et al. ........... 379/406.13 |
| 7,016,831 | B2 * | 3/2006 | Suzuki et al. .................. 704/203 |
| 7,222,069 | B2 * | 5/2007 | Suzuki et al. ................. 704/201 |
| 7,692,087 | B2 * | 4/2010 | Okazaki et al. ................ 84/600 |
| 2003/0135363 | A1 * | 7/2003 | Li et al. ........................ 704/215 |
| 2004/0015346 | A1 * | 1/2004 | Yasunaga et al. ............. 704/219 |
| 2004/0069118 | A1 * | 4/2004 | Okazaki et al. ................ 84/603 |
| 2006/0081118 | A1 * | 4/2006 | Okazaki et al. ................ 84/604 |
| 2008/0027716 | A1 * | 1/2008 | Rajendran et al. ............ 704/210 |
| 2008/0086302 | A1 * | 4/2008 | Krishnan et al. .............. 704/225 |
| 2011/0122310 | A1 * | 5/2011 | Kudo ............................ 348/349 |

* cited by examiner

*Primary Examiner* — Michael Colucci
(74) *Attorney, Agent, or Firm* — Roger S. Burleigh

(57) ABSTRACT

A double talk detector for controlling the echo path estimation in a telecommunication system by indicating when a received coded speech signal is dominated by a non-echo signal; i.e., that so-called double talk exists. This is determined by extracting LSPs from a coded speech frame of the received coded speech signal when the signal power exceeds a first threshold value, converting each of said extracted LSPs into LSFs, and calculating the distance between each two adjacent LSFs. For each distance that is smaller than a second threshold, a spectral peak is located between the two LSFs, and it is determined whether said spectral peak is an echo or not. When a predetermined number of non-echo spectral peaks are located in the received speech signal, double talk will be indicated, and the echo path estimation may be disabled.

28 Claims, 4 Drawing Sheets

DOUBLE TALK DETECTOR

TECHNICAL FIELD

The present invention relates to a method of detecting that a received coded speech signal is dominated by a non-echo signal, and to a method of estimating the echo path in a telecommunication system. Further, the invention relates to a double talk detector, and to an echo path estimating device comprising a double talk detector.

BACKGROUND

The transmission of speech, e.g. by mobile phones and IP-phones, normally involves speech coding, which is the compression of speech into a code for transmission with speech codecs. The CELP (Code-Excited Linear Predictive)-coding is a commonly used speech coding method comprising two stages, i.e. a linear predictive stage that models the spectral envelope and a code-book stage that models the residual of the linear predictive stage.

In addition to the actual speech coding of the signal, channel coding may be used for the transmission of the signal in order to avoid losses due to transmission errors, and the most important bits in the speech data stream is often coded by the more robust channel coding, in order to get the best overall coding results.

It is important to reduce noise and disturbances in order to improve the speech quality in a mobile phone. The echoes, i.e. reflections of a Voice signal back to the speaking party, are a major disturbance, and the main echo source in a telephone network is the electrical reflection in the so-called hybrid circuit caused by impedance mismatch of the 4-wire to 2-wire conversion in the local exchanges of the PSTN (Public Switched Telephony Network). Normally, this electrical echo is removed by network echo cancellers installed close to the echo source in the telephone system, e.g. in the media gateways functioning as an interface between a packet switched network, using e.g. the IP (Internet Protocol) and a circuit switched network, e.g. the PSTN, or in the Mobile Services Switching Centres functioning as an interface between mobile networks and the PSTN. Network echo cancellers are also required in international exchanges, and may be needed in national telephone exchanges having a large end-to-end transmission delay. Further, if no echo canceller is present in a telephone exchange close to the echo source, an international operator in another country may want to reduce the echo by detecting the and removing the echo generated in the distant telephone exchange.

Another echo source within a mobile communication network is the acoustic crosstalk occurring inside a mobile phone or an IP-phone, caused by acoustical coupling between the microphone and loudspeaker. In order to reduce the acoustical coupling in accordance with the standard requirements, a mobile phone normally provides echo attenuation. However, even though a mobile phone provides echo attenuation according to the requirements, echo originating from acoustic crosstalk may still occur, e.g. due to large variations in the position of the mobile phone or deviations of the line levels from the nominal levels.

While a conventional network echo canceller is capable of controlling the electrical echo, an echo originating from acoustic crosstalk requires a different echo canceller. Since the signals in a mobile communication network are coded in a speech coder and then transmitted over a radio channel that introduces bit-errors, the echo path will be nonlinear and non-stationary and introduce an unknown delay. Thereby, a conventional network echo canceller is unable to handle acoustic echoes returned from mobile phones.

Conventionally, echo control includes determination of whether a received speech-signal is dominated by a component originating in the vicinity of the receiver, i.e. from a so-called near-end, or by reflections, an echo, of a known speech signal originating from a distance, i.e. from a so-called far end. A reflected known speech signal from a far end, i.e. an echo, will be delayed, transformed and mixed with the speech signal and noise originating from the near end. This is illustrated schematically in FIG. 1, showing a first mobile phone $1a$ and a second mobile phone $1b$. A first speech signal 3 is transmitted from the first mobile phone $1a$ and delayed and transformed in the first network path $2a$, before reaching the second mobile phone $1b$. However, a reflected portion 4 of this speech signal will be reflected and returned through the second network path $2b$ to be received by the first mobile phone $1a$ as an echo of the known first speech signal 3. Thus, this echo signal, i.e. the far-end signal, received by the first mobile phone originates from the first speech signal, passing both networks paths $2a$, $2b$.

A second speech signal 5 transmitted from the second mobile phone $1b$ will be added to the echo signal 4 originating from the first speech signal 3. Thus, a received speech signal 6 reaching the first mobile phone $1a$ will comprise both an echo signal component 4, i.e. the far end-signal, and this second speech signal component 5, i.e. the near end-signal, which is unknown to the first mobile phone $1a$. A received speech signal 6 that is dominated by a near end-signal 5, and not by an echo-signal 4, may be referred to as double talk, and the determination that a speech signal is dominated by a near end-signal is hereinafter referred to as double talk-detection. The far-end component of the received signal 6 that is a reflection of the first speech signal 3 may be suppressed by an echo control device in order to reduce the disturbances and noise.

An echo control device normally estimates the characteristics of an echo path, and this estimation will be disturbed by an unknown speech signal originating from a near end. Therefore, a conventional echo control devices avoids estimating the characteristics of the echo path in the presence of speech originating from a near end. Instead, the echo control device will detect the presence of near end-speech by the above described double talk detection, and the estimation of the echo path characteristics will be inactivated or disabled during the periods when the received signal is dominated by the near end talk.

The double talk detection can be performed e.g. by comparing the signal levels of the near end-component and the far end-component in order to detect the double talk, such as e.g. by a Geigel detector, as described e.g. by D. L Duttweiler in "A twelve-channel digital echo canceller", IEEE Transactions on Communications, Vol. COM-26, No. 5, May 1978. However, the accuracy of this double talk detection is comparatively low, since it assumes that the echo signal power is always lower than the constant times far end signal power, and double talk is declared if the signal returned from near end has higher short term power than the constant times far end signal power. Thereby, the detector will miss any weak double talk condition, caused by difference in line levels, or by the near end speaker talking with a lower voice than the far end speaker. Additionally, this constant may be difficult to determine, in particular for acoustic echo, which may be stronger than the far end signal causing it, due to amplification in the echo path.

Alternatively, the double talk detection includes computing of the cross correlation, covariance or coherence functions of the near end-component and the far end-component, as described e.g. in the U.S. Pat. No. 6,035,034 and U.S. Pat. No. 6,766,019. This results in an improved detection performance, but requires a higher computational complexity.

As described above, the speech signals in a mobile telecommunication network are normally transported in a coded format, and the AMR (Adaptive Multi-Rate) is an example of an audio data compression scheme optimized for speech coding. The AMR is commonly used to code the speech signals in GSM-(Global System for Mobile communication) and UMTS-(Universal Mobile Telecommunication System) networks, and it involves link adaptation to select from one of eight different bit rates based on link conditions. The AMR may use different techniques, such as e.g. the above-described CELP, or DTX (Discontinuous Transmission), VAD (Voice Activity Detection) or CNG (Comfort Noise Generation), and the link adaptation may select the best codec mode to meet the local radio channel and capacity requirements. In case of poor radio transmission, the channel coding will increase, which will improve the quality and robustness of the network connection, but will lead to a deteriorated voice signal.

Similarly, IP-telephony speech signals are normally coded in the sending mobile phone and transported over the network to another mobile terminal/phone, without any decoding in the network.

Thus, the network echo control will have to be applied on the coded signals, preferably by modifying the parameters in the coded bit-stream directly, without decoding the signals, and without performing a second encoding after removal of the echo, since decoding followed by coding may destroy the positive speech quality-effects of the TFO (Tandem Free Operation) and the TrFO. (Transcoder Free Operation) that is normally introduced in modern telecommunication networks in order to enhance the speech quality.

An additional drawback in conventional double talk detection is that signal waveforms are needed for the computation of the detection variable, requiring decoding of the speech signal before the detection. However, the ability to work directly on coded bit-stream is becoming increasingly important due to the use of TrFO (Transcoder Free Operation) and TFO (Tandem Free Operation) in order to enhance the speech quality, since decoding followed by coding reduces the positive speech quality-effects of the TFO (Tandem Free Operation) and the TrFO. Transcoder Free Operation).

Further, since network echo control normally involves double talk detection, i.e. determination that a received speech signal is dominated by a near end-signal, an improved double talk detection will improve the network echo control.

Therefore, it still presents a problem to achieve an improved and accurate double talk detection that is applicable on a coded speech signal.

SUMMARY

The object of the present invention is to address the problem outlined above, and this object and others are achieved by the methods and devices according to the appended claims.

According to a first aspect, the invention provides a method of detecting that a received coded speech signal is dominated by a non-echo signal, and the method comprises the following steps:

If the signal power of a received speech signal exceeds a first threshold value, then extracting the LSPs (Line Spectral Pairs) from a coded speech frame of said received speech signal;

Converting each of said extracted LSPs into LSFs (Line Spectral Frequencies), $\omega i$, and calculating the distance between each two adjacent LSFs;

For each of said distances that is smaller than a second threshold value, calculating the frequency of the spectral peak $\omega c$ surrounded by said LSFs, and determining whether said spectral peak is an echo.

Thereby, a reliable detection of double talk is accomplished, i.e. that a received speech signal is dominated by a non-echo signal. Since only partial decoding is required in order to obtained the required parameters, e.g. the LSFs (Line Spectral Frequencies) are obtained by a conversion of the LSPs (Line Spectral Pairs), which are extracted from the coded speech signal, the invention is applicable directly on coded speech and on non-linear echo paths.

The method may comprise the further steps of:

Incrementing a counter for each located spectral peak that is not an echo;

Indicating double-talk when the counter reaches a predetermined threshold value.

The determination whether a spectral peak is an echo may comprise the following steps:

Extracting the LSPs (Line Spectral Pairs) from a coded speech frame of a first speech signal, and converting said LSPs into the corresponding LSFs (Line Spectral Frequencies), $\omega i$;

Determining that said spectral peak is an echo, if the distance between the adjacent LSFs surrounding said spectral peak $\omega c$ in the first speech signal is smaller than a third threshold value.

Further, the method may determine whether a spectral peak $\omega c$ is an echo only if the frequency of said spectral peak $\omega c$ is lower than a fourth threshold value, in order to improve the tolerance to noise.

To improve the accuracy, a closely located second spectral peak may be searched for in the first speech signal, if a spectral peak is not an echo by the steps of:

Calculating a second spectral peak in the first speech signal from two adjacent LSFs;

Determining that said second spectral peak is an echo if the distance between the calculated second spectral peak and the centre frequency $\omega c$ is smaller than a fifth threshold value.

The LSFs (Line Spectral Frequency), denoted by $\omega i$, may be obtained from the LSPs (Line Spectral Pairs), $q i$, by a conversion of each of the extracted. LSPs (Line Spectral Pairs), $q i$, into the corresponding LSF using the relationship $q i = \cos(\omega i)$, and the centre frequency $\omega c$ of a spectral peak may be determined by locating two adjacent LSFs, $\omega i+1-\omega i$, and calculating $\omega c = (\omega i+1-\omega i)/2$. Further, the speech coding may be based on AMR-CELP-coding.

According to a second aspect, the invention provides a method of echo path estimation in a telecommunication system, and the echo path estimation is deactivated when a received coded speech signal is dominated by a non-echo-signal, as detected by a method according the first aspect.

According to a third aspect, the invention provides a double talk detector arranged to be connected to a coded received speech signal and to a coded transmitted first speech signal in a telecommunication system, in order to determine when said received speech signal is dominated by a non-echo signal. The double talk detector comprises:

A signal power monitor arranged to determine when the signal power of a received speech signal exceeds a first threshold value;

A spectral peak locator arranged to:
  Extract the LSPs (Line Spectral Pairs) from a coded speech frame of the received speech signal, and to convert each of said extracted LSP into the corresponding LSF (Line Spectral Frequency), $\omega_i$;
  Calculate the distance between each two adjacent LSFs, and calculate a spectral peak $\omega_c$ surrounded by two LSFs separated by a distance that is smaller than a second threshold value;
  An echo locator arranged to determine whether a located spectral peak $\omega_c$ is an echo.

The double talk detector may be further arranged to indicate that said received speech signal is dominated by a non-echo signal, if a predetermined number of spectral non-echo peaks are located in the received signal, and may comprise a counter for counting the number of spectral non-echo peak in the received speech signal.

Said echo locator may be arranged to:
  Extract the LSPs (Line Spectral Pairs) from a coded speech frame of the first speech signal, and convert said extracted LSPs into the corresponding LSFs;
  Calculate the distance between the adjacent LSFs surrounding said spectral peak $\omega_c$, and determine that the spectral peak is an echo if said calculated distance is smaller than a third threshold value.

Said echo locator may be further arranged to determine whether a spectral peak $\omega_c$ is an echo only if the frequency of said spectral peak $\omega_c$ is lower than a fourth threshold value, and to search for a closely located second spectral peak in the first speech signal, if said spectral peak is not an echo, by calculating a second spectral peak from said LSFs, and determining that said second spectral peak is an echo, if the distance to the centre frequency $\omega_c$ is smaller than a fifth threshold value.

According to a fourth aspect, the invention provides an echo path estimating device for a telecommunication system, arranged to deactivate the estimation of an echo path dominated by a non-echo-signal, the echo estimating device comprising a double talk detector, according to the third aspect, arranged to be connected to a coded received speech signal and to a coded transmitted first speech signal in said telecommunication system.

Thus, the double talk detection according to this invention will provide an, improved echo control by enabling a deactivation of the echo path estimation in a coded speech signal when the double talk detector indicates that the received signal is dominated by a near-end signal that is not an echo.

BRIEF DESCRIPTION OF THE DRAWINGS

The present invention will now be described in more detail and with reference to the accompanying drawings, in which.

DETAILED DESCRIPTION

In the following description, specific details are set forth, such as a particular architecture and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application-specific integrated circuit. Where the invention is described in the form of a method, the invention may also be embodied in a computer program product, as well as in a system comprising a computer processor and a memory, wherein the memory is encoded with one or more programs that may perform the described functions.

Figure 1:
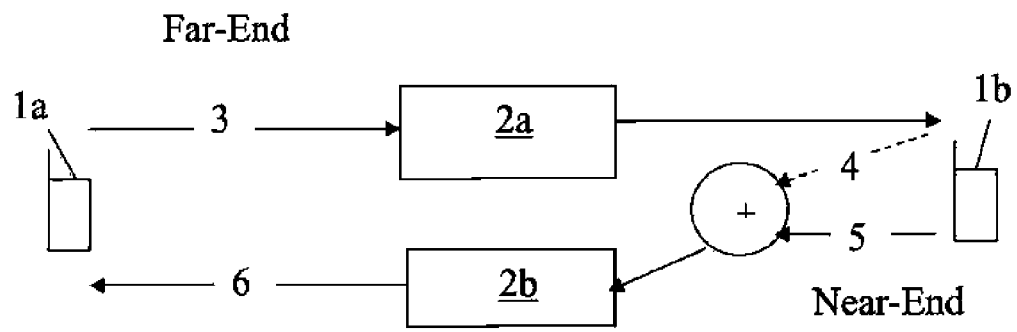
FIG. 1 is a block diagram schematically illustrating the echo-path in communication between two mobile phones.

The concept of this invention, with reference to FIG. 1, is to detect that a received speech signal 6 is dominated by a non-echo signal, i.e. by an unknown speech/noise component 5 from a near-end, by examining the LSFs (Line Spectral Frequencies) obtained by conversion of the LSPs (Line Spectral Pairs) extracted from the coded speech frames. The LSFs are examined both in the received signal 6, which comprises said unknown near-end component 5 and an echo-component 4 from the far-end, and directly in said first speech signal 3, said echo component 4 being a reflection of the first speech signal transmitted from the first mobile phone 1a. According to this invention, it is determined that a received speech signal 6 is dominated by a non-echo signal, i.e. that double talk exists, when a predetermined number of one or more spectral non-echo peaks are detected in the received speech signal 6, when the signal power of the received speech signal 6 is large. More specifically, a spectral non-echo peak is detected if the examination of LSFs in the received speech signal 6 reveals a distance between two adjacent LSFs that is smaller than a threshold value, and if no corresponding spectral peak is detected in the first speech signal 3, while the power of the received speech signal 6 is exceeding a power threshold value.

An echo path estimation device comprising a double talk detector, according to this invention, is arranged to disable the estimation of the characteristics of the echo path when the double talk detector indicates the existence of double talk, in order to avoid the disturbances caused by double talk.

Thus, in order to distinguish the presence of an unknown near end-signal 5 from a far end-echo signal 4, which is a reflection of a known signal, this invention determines the dissimilarity between the first speech signal 3 and the received signal 6. The received signal comprises both a reflected echo-component 4 originating from the known first speech signal 3 transmitted by the first mobile phone 1a, and the unknown second speech/noise signal 5 from the near-end, i.e. originating from the second mobile phone 1b. The dissimilarity is determined by locating the spectral peaks in the received signal 6 and in the first speech signal 3 and comparing the locations of the peaks in the respective signals. The spectral peaks in a speech signal are obtained by extracting the LSPs, (Line Spectral Pairs), denoted by $q_i$, in a coded speech signal and converting the LSPs to LSFs (Line Spectral Frequencies), denoted $\omega_i$, using the relationship $q_i = \cos(\omega_i)$. The LSPs are extracted from the received signal 6, which comprises both the reflected component 4 of the first speech signal 3 and the second speech/noise signal 5, as well as directly in the first speech signal 3, and the extracted LSPs are converted into LSFs. Double talk will be indicated if certain conditions are fulfilled regarding the LSFs, and regarding the signal power of the received signal 6.

Figure 2:
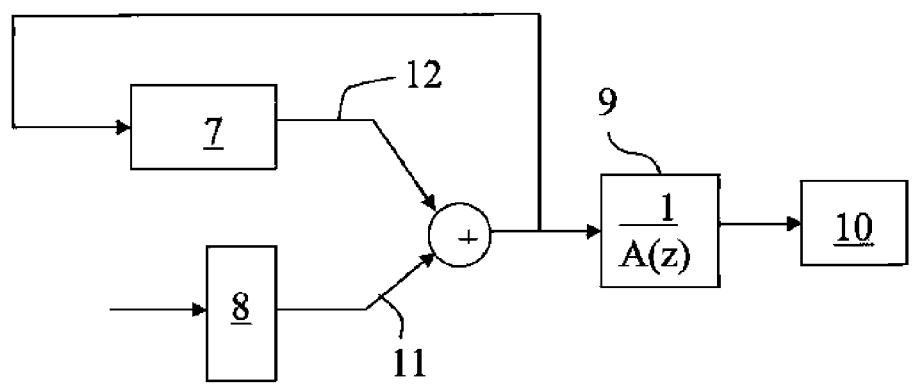
FIG. 2 illustrates conventional AMR-CELP-synthesis.

FIG. 2 is a block diagram schematically illustrating an AMR (Adaptive Multi-Rate) speech decoder, based on the CELP (Code-Excited Linear Predictive Coding) Synthesis model, onto which this invention is applicable, according to an exemplary embodiment. However, further embodiments of this invention are applicable on other speech codecs, in particular those based on CELP synthesis model. In FIG. 2, an excitation signal is constructed by adding an adaptive code vector from an adaptive codebook 7, scaled by the pitch gain in 12, and a fixed code vector from a fixed codebook 8, scaled by the innovative gain in 11, and reconstructing the speech by filtering the excitation signal in an LP (Linear Prediction) synthesis filter 9. Finally, the reconstructed speech signal is passed through an adaptive post-filter 10.

An AMR codec is normally applied on frames having a length of 20 ms, comprising 160 samples, and each frame is divided into four sub-frames having a length of S ms, and 40 samples, and the parameters available in a bit-stream are the LSP (Line Spectral Pair)-vectors, the fractional pitch lags (pitch period), the innovative code-vectors, as well as the pitch gain and the innovative gain. The LSP-vectors carry information on the AR (Auto Regressive)-model of the speech and represent the Linear Prediction (LP) synthesis polynomial coefficients in a "quantization friendly" form. The LSP-vectors carry exactly the same spectral information of the speech signal as the following expression of the LP-polynomial:

$$A(z) = 1 + \sum_{k=1}^{K} a_k z^{-k}$$

In this polynomial, ak denotes the LP (Linear Prediction) coefficient, and z is a complex variable. The LP filter coefficients, ak, k=1, . . . , 10, are convertable to the LSP—(Line Spectral Pair) representation for quantization and interpolation purposes, and for an LP filter of the 10th order, the LSPs being defined as the roots of the sum and difference polynomials:

$$F'_1(z)=A(z)+z^{-11}A(z^{-1}) \text{ and } F'_2(z)=A(z)-z^{-11}A(z^{-1}),$$

respectively, and the polynomials $F'_1(z)$ and $F'_2(z)$ are symmetric and anti-symmetric, respectively. Every root of these polynomials are located on the unit circle and is alternating, such that $F'_1(z)$ has a root z=-1, ($\omega=\pi$) and $F'_2(z)$ has a root z=1 ($\omega=0$). To eliminate these two roots, two new polynomials are defined, namely:

$$F_1(z)=F'_1(z)/(1+z^{-1}) \text{ and } F_2(z)=F'_2(z)/(1-z^{-1})$$

Each polynomial has five conjugate roots on the unit circle ($e^{\pm j\omega_i}$), and therefore the polynomials can be written as $$F_1(z) = \prod_{i=1,3,\ldots,9} (1 - 2q_i z^{-1} + z^{-2})$$

and $$F_2(z) = \prod_{i=2,4,\ldots,10} (1 - 2q_i z^{-1} + z^{-2})$$

The so-called Line Spectral Frequencies, LSFs, $\omega i$ can be used to locate the spectral peaks of a speech frame, and the relationship between the LSPs (Line Spectral Pairs), denoted qi, that are present in a coded speech signal, and the LSFs are described by $qi=\cos(\omega i)$, and $\omega i$ satisfies the ordering property $0<\omega 1<\omega 2<\omega \ldots <\omega 10<\pi$.

Figure 3:
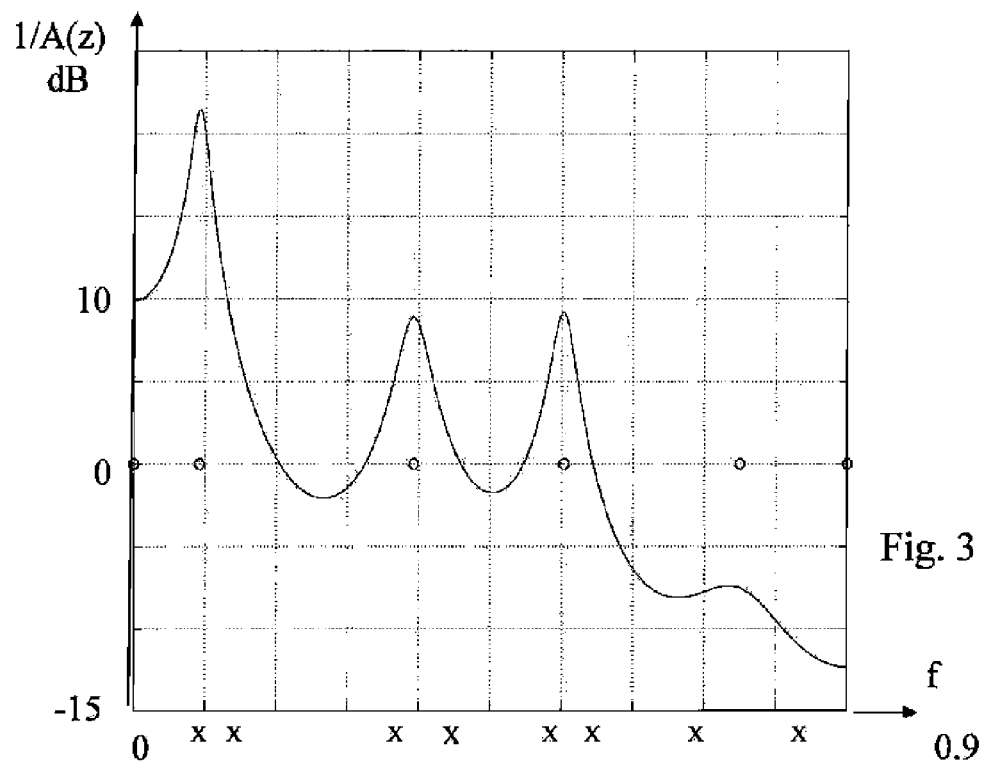
FIG. 3 illustrates graphically the frequency characteristics of 1/A(z) and the location of the roots of A(z)

An LP filter models the vocal tract as an autoregressive (all-pole) filter and is able to represent up to five spectral peaks. A speech signal normally has a peaky short-time spectrum, and the peaky line in FIG. 3 illustrates graphically the frequency characteristic of 1/A(z) at a normalized frequency from 0 to 0.9 in a typical AMR-speech frame. The frequency locations of the LSFs, $\omega i$, are indicated by x-symbols, and closely spaced LSFs surround each location of a spectral peak and the corresponding root of A(z). Said roots are indicated by small circles in the graph illustrating their angular position, each root of A(z) corresponding to an illustrated spectral peak, being surrounded by two closely spaced LSFs. Note that the roots of A(z) will appear in complex conjugate pairs, but only the roots corresponding to the positive frequencies: are illustrated in FIG. 3.

Figure 4:
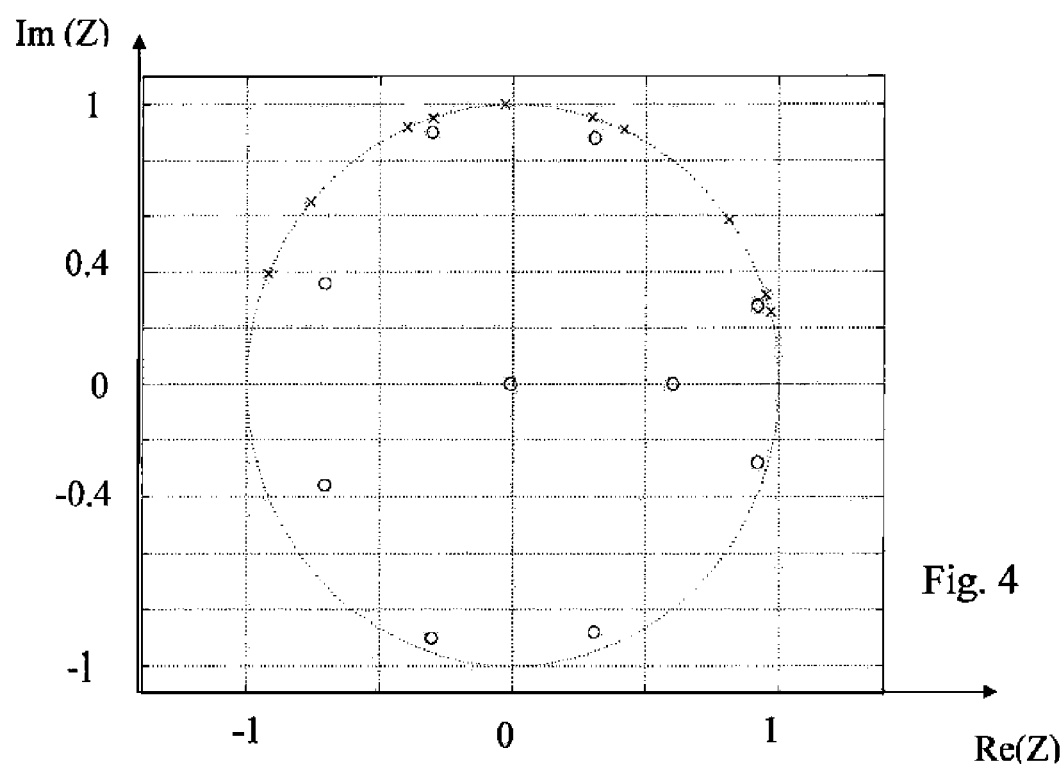
FIG. 4 illustrates graphically the complex roots of A(Z) and the corresponding LSFs.

FIG. 4 illustrates graphically the real part and the imaginary part of said complex roots to A(z), indicated as small circles. The LSFs are indicated by small x-symbols in the graph, and two closely spaced LSFs surround each of the first four roots on the unit circle, these four roots corresponding to the four roots indicated in FIG. 3. FIG. 4 reveals that the narrowness of a spectral peak in the LP filter frequency response determines the closeness of the corresponding root of A(z) to the unit circle. The first root in FIG. 3, corresponding to the root z≈0.8+j0.33 in FIG. 4, is located much closer to the unit circle in FIG. 4 and has more closely spaced LSFs than the fourth root in FIG. 3, corresponding to the root z≈-0.75+j0.39 in FIG. 4. Thus, the LSFs are always placed on the unit circle and located to surround the roots of A(z). In addition, the distance between two. LSFs surrounding a root of A(z) close to the unit circle is smaller than the distance between two LSFs surrounding a root of A(z) more distant from the unit circle. This invention uses the relationship of the distance between two adjacent LSFs and the corresponding roots/spectral peaks, as indicated in the FIGS. 3 and 4, in the detection of double talk, i.e. that a received speech signal is dominated by an unknown speech/noise component from a near-end and not by an echo-component from a far-end.

Thus, this invention detects double talk by using the relationship between the height of the spectral peaks and the distance between the LSFs surrounding the peak, and examines the LSFs, $\omega i$, in a received speech frame by extracting the coded LSPs, qi, and converting the LSPs into the corresponding LSFs from the relationship $qi=\cos(\omega i)$. Double talk will be declared if the signal power in the received signal 6 is significant, and if adjacent and closely spaced LSFs indicate the existence of one or more spectral peaks in the received signal 6, not corresponding to any spectral peak in the first speech signal 3.

According to a first exemplary embodiment of the invention, the detection of double talk, i.e. that a received coded speech signal is dominated by a non-echo signal, is performed by monitoring the power of the received signal 6, and when this exceeds a first threshold value, e.g. -45 dBm0, the LSPs of a coded speech frame in the received signal 6 are extracted and converted into the corresponding LSFs. The distance $\Delta i=\omega i+1-\omega i$ between each two adjacent LSFs is calculated, and if this distance is less than a second threshold value, e.g. $0.03\pi$, the centre frequency $\omega c$ of the spectral peak located between said two LSFs is calculated as $\omega c=(\omega i+1-\omega i)/2$. Thereafter, it is determined whether a located spectral peak in the received speech signal 6 is an echo by locating any corresponding spectral peak in the first speech signal 3. According to this first exemplary embodiment, the first speech signal 3 is examined by extracting the LSPs from a coded speech frame of the first speech signal 3, converting the LSPs into the corresponding LSFs, and locating the pair of LSFs surrounding the centre frequency ωc of said spectral peak of the received signal. If the distance between this pair of LSFs is larger than a third threshold value, e.g. 4·Δi, it is determined that no corresponding spectral peak exists in the first speech signal 3, i.e. in the known far-end signal, and that the spectral peak at ωc in the received signal is not an echo signal.

When a predetermined number of non-echo spectral peaks are found in the speech frame of the received signal 6, e.g. by a counter reaching a predetermined value, it is determined that the received signal 6 is dominated by an unknown near-end signal 5, and double talk will be declared.

According to a second embodiment of this invention, a better noise tolerance is achieved by comparing the frequency ωc of the located spectral peak in the received signal 6 with a fourth threshold value, e.g. 0.8π, and examining the first speech signal 3 only if the frequency ωc of the located spectral peak is lower than this threshold. Otherwise, the spectral peak at the frequency ωc is assumed to be caused by noise.

According to a third embodiment of this invention, a higher accuracy is achieved by locating any existing spectral peak in the first speech signal 3 having a frequency that is slightly higher of lower than the frequency of a spectral peak ωc of the received signal 6, in case no exactly Corresponding spectral peak is found in the first speech signal 3. If such a spectral peak can be found, and the difference between the frequency of this spectral peak and the spectral peak ωc of the received signal is less than a fifth threshold value, then the spectral peak ωc located in the received signal will be assumed to be an echo, and the double talk counter will not be incremented.

An echo path estimating device, according to this invention, comprises a double talk detector, according to an embodiment of this invention, and the echo path estimating device is arranged to disable the echo path estimation while the double talk detector indicates the existence of double talk, i.e. that the received signal is dominated by a non-echo signal originating from a near-end, and not by an echo-signal originating from a far-end.

Figure 5:
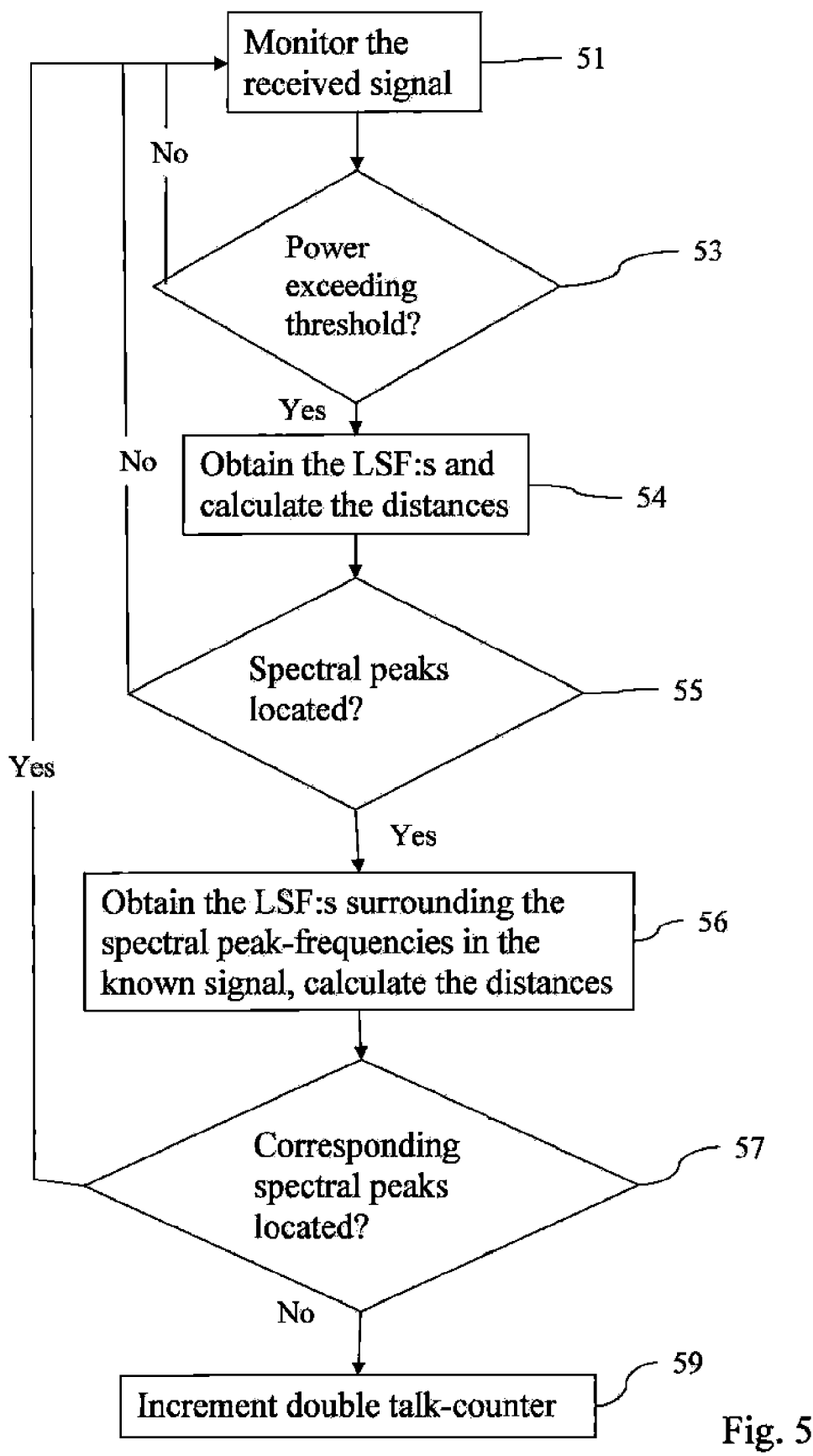
FIG. 5 is a flow diagram illustrating double talk detection, according to an embodiment of this invention.

FIG. 5 is a flow diagram illustrating a method of detecting double talk, according to the above described first embodiment of this invention. First, in step 51, the power of the received signal 6 is measured, and if it exceeds a first threshold value, in step 53, then the LSPs will be extracted from a coded speech frame. The LSFs will be obtained by converting each LSP into the corresponding LSF, and the distance between each two adjacent LSFs will be calculated, in step 54. For each distance that is smaller than a second threshold value, the centre frequency of the spectral peak located between the LSFs is calculated, in step 55. In step 56, the LSPs are extracted from the first speech signal 3 and converted into LSFs, followed by a determination of the adjacent LSFs of the first speech signal 3 that are surrounding the frequencies of each spectral peak located in the received signal 6, and a calculation of the distances between them. In step 57, it is determined whether each of the calculated distances is larger than a third threshold, thereby indicating that no corresponding spectral peak is located in the first speech signal 3, and that the spectral peak in the received signal is not an echo. For each spectral peak that is not an echo, a double talk-counter will be incremented, in step 59. If the double talk-counter reaches the predetermined threshold value, double talk will be indicated, which may disable any echo path estimation in an echo control device comprising such a double talk detector.

Figure 6:
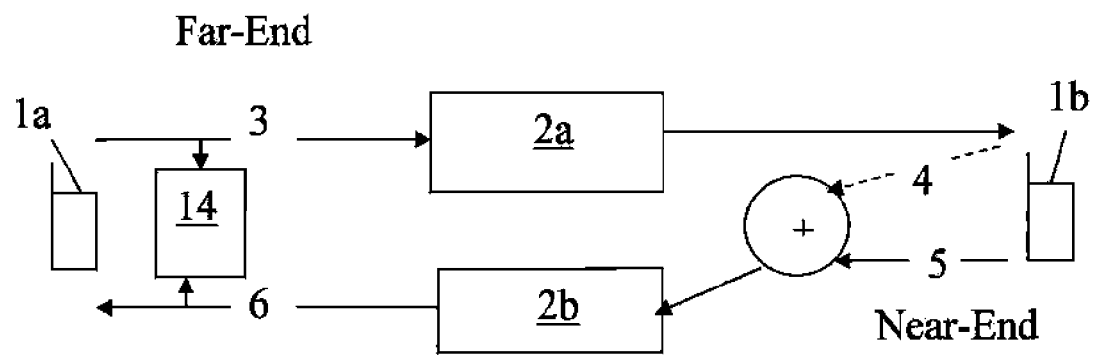
FIG. 6 is the block diagram according to FIG. 1, provided with a double talk detector, according to this invention.

FIG. 6 is a block diagram illustrating the location of a double talk detector 14, and the path of a first speech signal 3 transmitted from a first mobile phone 1a, through the delay and transformations in 2a, reaching the second mobile phone 1b. An echo 4 of this first speech signal is transmitted back to the first mobile phone 1a, together with a second unknown speech/noise signal 5 originating in the vicinity of the second mobile phone 1b, the combined received signal 6 passing delay and transformations in 2b, before reaching the first mobile phone 1a. A double talk detector 14 according to an exemplary embodiment of this invention is arranged to monitor the signal power of the received signal 6, and to extract LSPs (Line spectral pairs), qi, in both the first speech signal 3 and in the received signal 6, when the signal power exceeds a power threshold. The LSPs will be converted to LSFs (Line Spectral Frequencies), ωi, using the relationship qi=cos(ωi), and the LSFs will be examined in order to detect spectral peaks in the received signal 6 that are not echoes originating from the first speech signal 3. If a predetermined number of non-echo spectral peaks is detected in a speech frame of the received signal 6, then it is determined that the received signal is dominated by a non-echo signal originating from a near-end, and double talk will be indicated. While double talk is indicated, the echo path estimation in an echo path estimating device 15 provided with the double talk detector 14 may be disabled.

Figure 7:
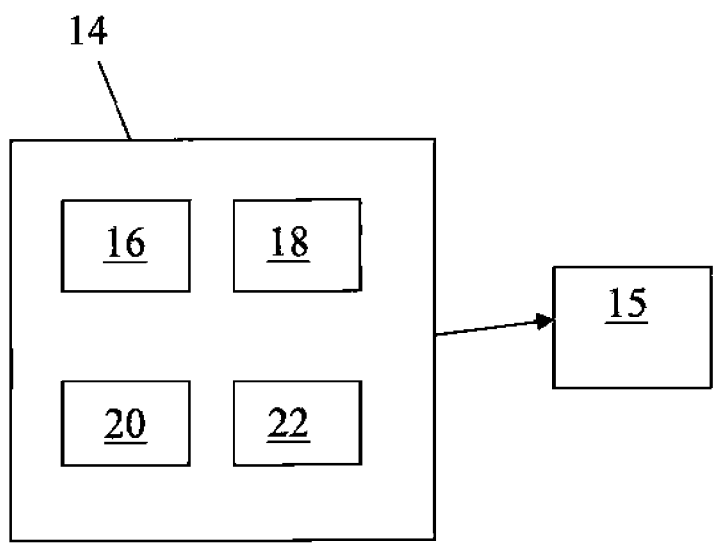
FIG. 7 is a block diagram illustrating a double talk detector according to this invention, as well as an echo path estimating comprising such a double talk detector.

FIG. 7 is a block diagram illustrating the functional features of a double talk detector 14, according to an exemplary embodiment of this invention, connected to an echo path estimating device 15 that is capable of estimating an echo path in a telecommunication system.

The double talk detector 14, according to this embodiment of the invention, comprises a signal power monitor 16 arranged to initiate the location of spectral peaks in the received speech signal 6 when the measured signal power exceeds a first threshold value. The double talk detector 14 comprises a spectral peak locator, 18, arranged to locate any spectral peaks in the received speech signal by extracting the LSPs, qi, and converting the extracted LSPs into the corresponding LSFs, ωi, using the relationship qi=cos(ωi). Thereafter, the distance between each two adjacent LSFs is calculated and compared with a second threshold value, and for each distance that is smaller than said second threshold value, the frequency of the spectral peak ωc is calculated. Furthermore, the double talk detector comprises an echo locator 20 for determining whether each spectral peak ωc located in the received speech signal is an echo. When a predetermined number of non-echo spectral peaks are located in the received speech signal, double talk will be indicated, and the estimation of the echo path will be deactivated.

According to this exemplary embodiment of this invention, the echo locator 20 is arranged to determine whether a spectral peak ωc of the received speech signal is an echo by extracting the LSFs from a coded speech frame of in the first speech signal, converting the LSPs into the corresponding LSFs, and locating the two LSFs surrounding ωc. Thereafter, the distance between those two LSFs is calculated, and if this distance is larger than a third threshold value, then it is determined that no corresponding spectral peak exists in the first speech signal, and that the spectral peak ωc, located in the received speech signal, is a non-echo spectral peak, and not an echo.

The method of detecting that a received speech signal is dominated by a non-echo signal, as well as the double talk detector and echo estimation device, according to this invention, allows a reliable detection of double talk, and is applicable on non-linear echo paths, as well as on coded speech, since only partial decoding is required in order to obtain the required parameters, e.g. the LSFs (Line Spectral Frequencies) from the LSPs (Line Spectral Pairs) extracted from the coded speech signal. Thus, the double talk detector according to this invention will provide an improved echo control by enabling a deactivation of the echo path estimation when the double talk detector indicates that the received signal is dominated by a near-end signal that is not an echo.

While the invention has been described with reference to specific exemplary embodiments, the description is in general only intended to illustrate the inventive concept and should not be taken as limiting the scope of the invention.

The invention claimed is:

1. A method of detecting that a received coded speech signal is dominated by a non-echo signal, comprising the steps of:
    if the signal power of a received speech signal exceeds a first threshold value, then extracting the Line Spectral Pairs (LSPs) from a coded speech frame of said received speech signal;
    converting each of said extracted LSPs into Line Spectral Frequencies (LSFs), $\omega i$, and calculating the distance between each two adjacent LSFs; and,
    for each of said distances that is smaller than a second threshold value, calculating the frequency of the spectral peak, $\omega c$, surrounded by said LSFs, and determining whether said spectral peak is an echo.

2. A method according to claim 1, comprising the further steps of:
    incrementing a counter for each located spectral peak that is not an echo;
    indicating double-talk when the counter reaches a predetermined threshold value.

3. A method according to claim 1, wherein the determination of whether a spectral peak is an echo comprises the steps of:
    extracting the LSPs from a coded speech frame of a first speech signal and converting said LSPs into the corresponding LSFs; and,
    determining that said spectral peak is an echo if the distance between the adjacent LSFs surrounding said spectral peak in the first speech signal is smaller than a third threshold value.

4. A method according to claim 1, further comprising determining whether a spectral peak is an echo only if the frequency of said spectral peak is lower than a fourth threshold value.

5. A method according to claim 3, further comprising searching for a closely located second spectral peak in the first speech signal if said spectral peak is not an echo, comprising the steps of:
    calculating a second spectral peak in the first speech signal from two adjacent LSFs; and,
    determining that said second spectral peak is an echo if the distance between the calculated second spectral peak and the centre frequency is smaller than a fifth threshold value.

6. A method according to claim 1, wherein the LSFs are obtained by converting each of the extracted LSPs into the corresponding LSF using the relationship $qi=\cos(\omega i)$.

7. A method according to claim 1, wherein the centre frequency of a spectral peak is determined by locating two adjacent LSPs, $\omega i+1-\omega i$, and calculating $\omega c=(\omega i+1-\omega i)/2$.

8. A method according to claim 2, wherein, an indication of double talk deactivates an echo path estimation in a telecommunication system.

9. A method of estimating an echo path in a telecommunication system, wherein the echo path estimation is deactivated by a double talk indication obtained by a method according to claim 2.

10. A method of estimating the echo path in a telecommunication system, wherein the echo path estimation is deactivated when a received coded speech signal is dominated by a non-echo-signal, the method comprising the steps of:
    if the signal power of a received speech signal exceeds a first threshold value, then extracting the Line Spectral Pairs (LSPs) from a coded speech frame of said received speech signal;
    converting each of said extracted LSPs into a corresponding Line Spectral Frequency (LSF), $\omega i$, and calculating the distance between each two adjacent LSFs;
    for each distance that is smaller than a second threshold value, calculating the frequency of the spectral peak, $\omega c$, surrounded by said LSF, and determining whether said spectral peak is an echo; and,
    deactivating the echo path estimation when a predetermined number of spectral non-echo peaks are located.

11. A method according to claim 10, wherein the determination of whether a spectral peak is an echo comprises the steps of:
    extracting the LSPs from a coded speech frame of a first speech signal and converting each extracted LSP into the corresponding LSF; and,
    determining that said spectral peak is an echo if the distance between the LSFs surrounding said spectral peak in the first speech signal is smaller than a third threshold value.

12. A method according to claim 10, further comprising determining whether a spectral peak is an echo only if the frequency of said spectral peak is lower than a fourth threshold value.

13. A method according to claim 10, wherein the speech coding is based on AMR-CELP-coding.

14. A double talk detector arranged to be connected to a coded received speech signal and to a coded transmitted first speech signal in a telecommunication system for determining when said received speech signal is dominated by a non-echo signal, the double talk detector comprising:
    a signal power monitor arranged to determine when the signal power of a received speech signal exceeds a first threshold value;
    a spectral peak locator arranged to:
        extract the LSPs from a coded speech frame of the received speech signal and to convert each of said extracted LSPs into a corresponding LSF; and,
        calculate the distance between each two adjacent LSFs, and calculate a spectral peak, $\omega c$, surrounded by two LSFs separated by a distance that is smaller than a second threshold value; and,
    an echo locator arranged to determine whether a located spectral peak is an echo.

15. A double talk detector according to claim 14, further arranged to indicate that said received speech signal is dominated by a non-echo signal if a predetermined number of spectral non-echo peaks are located in the received signal.

16. A double talk detector according to claim 14, further comprising a counter for counting the number of spectral non-echo peaks in the received speech signal.

17. A double talk detector according to claim 14, wherein the echo locator is arranged to:
    extract the LSPs from a coded speech frame of the first speech signal and convert said extracted LSPs into the corresponding LSFs; and, calculate the distance between the adjacent LSFs surrounding said spectral peak and determine that the spectral peak is an echo if said calculated distance is smaller than a third threshold value.

18. A double talk detector according to claim 14, wherein the echo locator is arranged to determine whether a spectral peak is an echo only if the frequency of said spectral peak is lower than a fourth threshold value.

19. A double talk detector according to claim 17, wherein said echo locator is further arranged to search for a closely located second spectral peak in the first speech signal, if said spectral peak is not an echo, by:
calculating a second spectral peak from said LSPs and determining that said second spectral peak is an echo if the distance to the centre frequency is smaller than a fifth threshold value.

20. A double talk detector according to claim 14, wherein the LSFs are obtained by converting each of the extracted LSPs into the corresponding LSF using the relationship $q_i = \cos(\omega_i)$.

21. A double talk detector according to claim 14, wherein the centre frequency of a spectral peak is determined by locating two adjacent LSFs, $\omega_{i+1} - \omega_i$, and calculating $\omega_c = (\omega_{i+1} - \omega_i)/2$.

22. An echo path estimating device for a telecommunication system, arranged to deactivate the estimation of an echo path dominated by a non-echo-signal, comprising a double talk detector for a coded speech signal according to claim 14.

23. An echo path estimating device for a telecommunication system, arranged to deactivate the estimation of an echo path dominated by a non-echo-signal, the echo path estimating device comprising:
a double talk detector arranged to be connected to a coded received speech signal and to a coded transmitted first speech signal in said telecommunication system, said double talk detector comprising:
a signal power monitor arranged to determine when the signal power of a received speech signal exceeds a first threshold value;
a spectral peak locator arranged to:
extract Line Spectral Pairs (LSPs) from a coded speech frame of the received speech signal and to convert each of said extracted LSPs into a corresponding Line Spectral Frequency (LSF), $\omega_i$;
calculate the distance between each two adjacent LSFs, and calculate a spectral peak, $\omega_c$, surrounded by two LSFs separated by a distance that is smaller than a second threshold value; and,
an echo locator arranged to determine whether a located spectral peak is an echo.

24. An echo path estimating device according to claim 23, wherein the double talk detector is further arranged to indicate that said received speech signal is dominated by a non-echo signal if a predetermined number of spectral non-echo peaks are located in the received signal.

25. An echo path estimating device according to claim 24, wherein the double talk detector comprises a counter for counting the number of spectral non-echo peak in the received signal.

26. An echo path estimating device according to claim 23, wherein the echo locator is further arranged to:
extract the LSPs from a coded speech frame of the first speech signal, and convert said extracted LSPs into the corresponding LSFs; and,
calculate the distance between the adjacent LSFs surrounding said spectral peak and determine that the spectral peak is an echo if said calculated distance is smaller than a third threshold value.

27. An echo path estimating device according to claim 23, wherein the echo locator is arranged to determine whether a spectral peak is an echo only if the frequency of said spectral peak is lower than a fourth threshold value.

28. An echo path estimating device according to claim 26, wherein said echo locator is further arranged to search for a closely located second spectral peak in the first speech signal if said spectral peak is not an echo, by calculating a second spectral peak from two adjacent LSFs, and determining that said second spectral peak is an echo if the distance to the centre frequency is smaller than a fifth threshold value.

* * * * *

UNITED STATES PATENT AND TRADEMARK OFFICE
CERTIFICATE OF CORRECTION

PATENT NO. : 8,260,613 B2
APPLICATION NO. : 12/528202
DATED : September 4, 2012
INVENTOR(S) : Trump It is certified that error appears in the above-identified patent and that said Letters Patent is hereby corrected as shown below:

On the Title Page, in Field (75), under "Inventor", in Column 1, Line 1, delete "Tallin" and insert -- Tallinn --, therefor.

On the Title Page, in the Figure, for Tag "54", in Line 1, delete "LSF:s" and insert -- LSFs --, therefor.

On the Title Page, in the Figure, for Tag "56", in Line 1, delete "LSF:s" and insert -- LSFs --, therefor.

In Fig. 5, Sheet 3 of 4, for Tag "54", in Line 1, delete "LSF:s" and insert -- LSFs --, therefor.

In Fig. 5, Sheet 3 of 4, for Tag "56", in Line 1, delete "LSF:s" and insert -- LSFs --, therefor.

In Column 1, Line 30, delete "Voice" and insert -- voice --, therefor.

In Column 3, Line 46, delete "TrFO. Transcoder" and insert -- TrFO (Transcoder --, therefor.

In Column 4, Line 48, delete "extracted." and insert -- extracted --, therefor.

In Column 5, Line 59, delete "A(Z)" and insert -- A(z) --, therefor.

In Column 6, Line 51, delete "signal comprises" and insert -- signal 6 comprises --, therefor.

In Column 7, Line 19, delete "of S ms," and insert -- of 5 ms, --, therefor.

In Column 8, Line 16, delete "frequencies:" and insert -- frequencies --, therefor.

In Column 10, Line 3, delete "signal is transmitted" and insert -- signal 3 is transmitted --, therefor.

Signed and Sealed this
Nineteenth Day of February, 2013

Teresa Stanek Rea
*Acting Director of the United States Patent and Trademark Office*